Patented Apr. 6, 1948

2,438,894

UNITED STATES PATENT OFFICE 2,438,894

PRODUCTION OF DERIVATIVES OF 3-SUBSTITUTED 2,4 DIKETONES

Albert B. Boese, Jr., Pittsburgh, Pa., assignor to Carbide and Carbon Chemicals Corporation, a corporation of New York No Drawing. Application July 7, 1945, Serial No. 603,754

8 Claims. (Cl. 260—433)

This invention relates to substituted γ-acetyl butyric acids having a hydrocarbon substituent in the γ-position, to esters of such acids, and to a novel method for producing such compounds from adducts of acrylonitrile and β-diketones. Many of these esters have properties adapting them for use as plasticizers for vinyl resins and other resinous plastics, cellulose esters and ethers, and other materials. They also may be employed as intermediates for the production of other esters of substituted γ-acetyl butyric acids. One feature of the invention involves the production of 3-substituted 3-cyanoethyl alkanediones-2,4, which are valuable intermediate compounds useful in the production of the aforesaid esters.

According to the invention, a 2,4-diketone having the keto carbon atoms connected by a methylene group, one hydrogen atom of which is substituted by a hydrocarbon residue, is condensed with acrylonitrile in the presence of a basic condensation catalyst. When reacting the diketone and acrylonitrile in the ratio of one of the former to between 1 and 1.5 mols of the acrylonitrile it has been found that 1 mol of the acrylonitrile condenses with 1 mol of the diketone to form the corresponding substituted 3-cyanoethyl dione-2,4.

Usually the condensation is conducted in the presence of a liquid diluent, which preferably is substantially inert to acrylonitrile. The diluent is removed from the reaction mixture by distillation, water is added to the residue, and the mixture is extracted with benzene. After removal of the benzene, the product is distilled under vacuum for elimination of the unreacted diketone, leaving as residue the substituted cyanoethyl dione, which may be washed with water or otherwise purified.

Excellent results are secured by introducing the acrylonitrile slowly in successive small amounts to a refluxing solution of the inert diluent containing the 3-substituted 2,4-diketone and a small amount of a basic condensation catalyst. Secondary alcohols such as isopropanol, and tertiary alcohols such as tertiary butanol, are eminently suitable as diluents, although other inert diluents may effectively be employed, such as the aromatic hydrocarbons; the aliphatic ethers, such as as diethyl ether and dioxane; and chlorinated solvents, such as the chlorinated hydrocarbons and ethers.

A mixture of the reactants also may be introduced into an inert diluent containing the catalyst.

The condensation reaction preferably is conducted at temperature between around 60° C. and around 100° C., although somewhat higher and lower temperatures may be employed. At temperatures much below 60° C., the condensation reaction becomes somewhat sluggish, and a high concentration of unreacted diketone and acrylonitrile may be built up before the condensation is initiated.

Among 3-substituted 2,4-diketones useful in the process may be mentioned 3-ethyl pentanedione-2,4; 3-butyl pentanedione-2,4; 3-(2-ethylbutyl) pentanedione-2,4; 3-(2-ethylhexyl) pentanedione-2,4; and 3-octyl hexanedione-2,4. Compounds of this type can be made by condensing the appropriate aldehyde, e. g., acetaldehyde, butyraldehyde, 2-ethyl butyraldehyde and 2-ethyl hexaldehyde, respectively, with pentanedione-2,4, in the presence of anhydrous hydrogen chloride, with subsequent hydrogenation of the condensation products, according to the following equations:

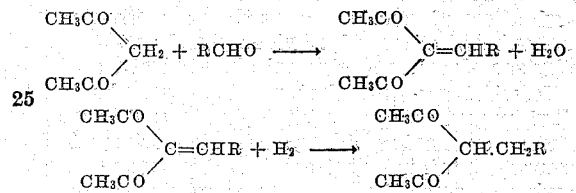

Acrylonitrile also reacts with the higher diketones-2,4 containing more than 5 carbon atoms, and substituted in the 3-position with a hydrocarbon residue to yield the corresponding 3-substituted cyanoethyl 2,4-diketone. However, these higher substituted cyanoethyl diones have no advantage over the more readily available 3-cyanoethyl pentanediones-2,4 substituted in the 3-position with a hydrocarbon residue, as intermediates for the production of substituted γ-acetyl butyric acids, and esters of such acids.

The most effective catalysts used in the condensation are strongly basic materials, the more active ones being the alkali metal hydroxides such as sodium and potassium hydroxides, and quaternary organic bases such as trimethyl benzyl ammonium hydroxide and tetraethanolammonium hydroxide. The catalyst usually is employed in the form of a 40% to 50% aqueous solution.

The condensation reaction may be represented by the following equation:

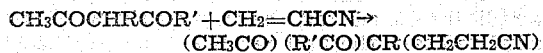

wherein R represents either an alkyl, an aralkyl or an aryl group, and R' representes either an alkyl, an aralkyl or an aryl group containing from 1 to 12 carbon atoms.

The substituted 3-cyanoethyl dione-2,4 formed in the aforesaid condensation yields, upon hydrolysis with mineral acids or with alkali metal hydroxides, the substituted γ-acetyl butyric acid in accordance with a reaction represented by the following equation:

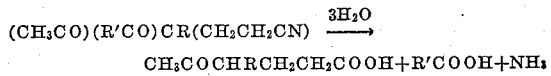

$$(CH_3CO)(R'CO)CR(CH_2CH_2CN) \xrightarrow{3H_2O}$$
$$CH_3COCHRCH_2CH_2COOH + R'COOH + NH_3$$

These substituted γ-acetyl butyric acids are high boiling water-insoluble liquids that are soluble in the common organic solvents such as ethanol, acetone, ethyl acetate, benzene, and chlorinated solvents. They may be esterified by means of alcohols and glycol ethers in well-known manner, in the presence of an esterification catalyst, to give the corresponding esters. These esters are high boiling liquids having solubility characteristics similar to the acids from which they are derived.

According to one form of the invention, the 3-substituted 3-cyanoethyl dione-2,4 is directly converted to an alkyl, aryl, alkoxyalkyl or aryloxyalkyl ester of a substituted γ-acetyl butyric acid by a simultaneous hydrolysis and esterification. This may be accomplished by heating the substituted 3-cyanoethyl dione-2,4, in the presence of an hydrolysis and esterification catalyst such as sulfuric acid, with a monohydric aliphatic or aromatic alcohol, a monoalkyl or monoaryl ether of a mono- or polyalkylene glycol having the desired terminal alkyl or alkoxy-alkyl group, or a dialkyl ether of glycerol. Among suitable esterifying agents may be mentioned the saturated aliphatic monohydric alcohols such as methanol, butanol, hexanol, 2-ethylhexanol, decanol, and the higher alcohols; aromatic alcohols such as benzyl alcohol; the monoalkyl and monoaryl ethers of glycols such as the monoethyl and monophenyl ethers of ethylene glycol and of diethylene glycol; and glycerol dimethyl ether.

Esterifying agents that provide esters having alkyl or aryl groups containing at least 6 carbon atoms, or having alkoxyalkyl or aryloxyalkyl groups containing at least 3 carbon atoms, are preferred, since the resultant esters appear particularly adapted for use as plasticizers for thermoplastic resinous materials.

The hydrolysis and esterification reactions preferably are conducted at temperatures ranging from about 60° C. to about 150° C. During the reaction one acyl group of the 3-alkyl, aryl or aralkyl substituted 3-cyanoethyl dione-2,4 is split off and recovered in the form of an ester of a carboxylic acid which, in a case where a cyanoethyl alkanedione is thus reacted, is a fatty acid. When these reactions are conducted concurrently, the reaction involved may be generally represented by the following equation:

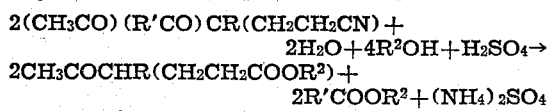

$$2(CH_3CO)(R'CO)CR(CH_2CH_2CN) +$$
$$2H_2O + 4R^2OH + H_2SO_4 \rightarrow$$
$$2CH_3COCHR(CH_2CH_2COOR^2) +$$
$$2R'COOR^2 + (NH_4)_2SO_4$$

wherein R represents either an alkyl, an aralkyl or an aryl group; R' represents an aralkyl group, an aryl group, or an alkyl group containing between 1 and 12 carbon atoms; and $R^2$ represents a radical selected from the class consisting of the alkyl radicals, the aryl radicals, the alkoxyalkyl radicals, and the aryloxyalkyl radicals.

By subjecting the aforesaid 3-substituted cyanoethyl diones-2,4 to hydrolysis and to esterification, conducted either concurrently or successively, it is possible to produce directly from the former, in good yields, the esters of γ-substituted γ-acetyl butyric acids with even the higher alkyl alcohols and alcohol ethers, such as hexanol, 2-ethylhexanol, the decanols, the tetradecanols, and the monoethyl and monobutyl ethers of the glycols, such as those of ethylene glycol and the polyethylene glycols.

It will be understood that the substituted γ-acetyl butyric acid esters of the higher alcohols and alcohol ethers also can be produced by an ester exchange reaction between such alcohol or alcohol ether and the methyl or ethyl ester of the substituted γ-acetyl butyric acid, catalyzed with an esterification catalyst such as sulfuric acid.

The following examples serve to illustrate the invention:

EXAMPLE I

*3-cyanoethyl-3-benzyl pentanedione-2,4*

To a refluxing solution of 100 grams of 3-benzyl pentanedione-2,4 and 1 cc. of a 50% aqueous potassium hydroxide solution in 200 cc. of isopropanol, 28 grams of acrylonitrile were added slowly with agitation over a period of forty-five minutes. During this time an additional 2 cc. of the potassium hydroxide were added in 0.5 cc. portions at equally spaced intervals. After removing the major portion of the isopropanol from the reaction mixture by distillation, 200 cc. of water were added to the residue, and this mixture was extracted with benzene. After removal of the benzene extract, the product was distilled under an absolute pressure of 5 mm. of mercury for removal of unreacted benzyl pentanedione, thereby yielding 80 grams of crude 3-cyanoethyl-3-benzyl pentanedione-2,4 in the form of a viscous oil of orange coloration, corresponding to a yield of 62% and an efficiency of 90%, based upon the 3-benzyl pentanedione reactant.

The 3-benzyl pentanedione-2,4 was produced by condensing benzaldehyde with pentanedione-2,4, in the presence of anhydrous hydrogen chloride. The resultant benzylidene pentanedione was then hydrogenated to the benzyl pentanedione.

EXAMPLE II

*γ-Benzyl-γ-acetyl butyric acid*

A mixture of 75 grams of 3-benzyl-3-cyanoethyl pentanedione-2,4, 300 cc. of water and 60 grams of sodium hydroxide was refluxed for three hours, during which time ammonia was evolved and a clear red solution produced. The solution was cooled, neutralized with hydrochloric acid, and the product extracted with benzene. After removal of the benzene from the extract, the residue was distilled under an absolute pressure of 2 mm. of mercury. There thus was obtained 60 grams of γ-benzyl-γ-acetyl butyric acid corresponding to a yield of 89%, in the form of a pale yellow oil, which was insoluble in water but soluble in the common organic solvents, and had the following properties:

Boiling point, 188°–189° C. at 2 mm. of mercury pressure.
Specific gravity, 20°/20° C., 1.1116.
Refractive index at 20° C., 1.5221.

EXAMPLE III

*γ-Benzyl-γ-acetyl butyrate, 2-ethylhexyl ester*

A solution of 35 grams of γ-benzyl-γ-acetyl butyric acid, 50 grams of 2-ethylhexanol-1 and 0.4 gram of concentrated sulfuric acid in 125 cc. of xylene was refluxed under a decanting head until the theoretical quantity of water had been removed. After washing the reaction mixture with water to remove the sulfuric acid, the reaction mixture was distilled under an absolute pressure of 2 mm. of mercury, thereby removing excess 2-ethylhexanol and providing a practically quantitative yield of the 2-ethylhexyl ester of γ-benzyl-γ-acetyl butyric acid as a pale yellow oil having the following properties.

Boiling point, 195°–200° C. at 2 mm. of mercury pressure.
Specific gravity, 20°/20° C., 0.9843.
Refractive index at 20° C., 1.4900.

Example IV

*3-cyanoethyl-3-ethyl-pentanedione-2,4*

To 200 cc. of refluxing isopropanol containing 3 cc. of a 50% aqueous potassium hydroxide solution 40 grams of 3-ethyl pentanedione-2,4 and 21 grams (a 30% excess) of acrylonitrile were added slowly with agitation over a period of thirty minutes. After refluxing the mixture for an additional two hours, the major portion of the solvent was removed by distillation, the residue taken up in 200 cc. of water, and the mixture extracted with toluene. The toluene extract was washed, and then distilled under reduced pressure, thereby obtaining 3-cyanoethyl-3-ethyl pentanedione-2,4 in amount corresponding to a yield of around 78%, based upon the ethyl pentanedione, as a colorless, viscous liquid distilling at 134°–136° C. under 4 mm. of mercury pressure. Upon standing, the product solidified to a crystalline solid which, after recrystallization from petroleum ether, melted at 54°–56° C.

Example V

*γ-Ethyl-γ-acetyl butyrate, ethyl ester*

A mixture of 25 grams of 3-ethyl-3-cyanoethyl petanedione-2,4, 40 cc. of 95% ethanol and 4 cc. of concentrated sulfuric acid was heated under reflux for thirty hours. Half the ethanol was then distilled off, 100 cc. of water added to the residue, and the oil which separated was extracted with toluene. The toluene extract was washed with water to remove ammonium sulfate and sulfuric acid. It was then fractionated under vacuum. γ-ethyl-γ-acetyl butyrate ethyl ester was recovered in amount corresponding to a yield of 80%, based upon the dione. The ester had the following properties:

Boiling point, 84°–86° C. at 3 mm. of mercury pressure.
Specific gravity, 20°/20° C., 0.9353.
Refractive index at 20° C., 1.4371.

Example VI

*γ-Ethyl-γ-acetyl butyrate, 2-ethylhexyl ester*

A solution of 60 grams of 2-ethylhexanol, 25 grams of γ-ethyl-γ-acetyl butyrate, ethyl ester and 0.5 gram of benzene sulfonic acid was heated for twenty hours under a column with a distilling head, during which time the ethanol which formed was distilled off. The mixture was washed with water to remove the catalyst, and was fractionated under vacuum. After removal of excess 2-ethylhexanol, γ-ethyl-γ-acetyl butyrate 2-ethylhexyl ester was obtained in amount corresponding to a 77% yield, based upon the ethyl ester. The 2-ethylhexyl ester had the following properties:

Boiling point, 148°–150° C. at 1.5 mm. of mercury pressure.
Specific gravity, 22°/22° C., 0.9071.
Refractive index at 20° C., 1.4475.

By varying the 3-substituent of the dione-2,4 used in making the 3-cyanoethyl 3-hydrocarbon substituted dione a wide variety of γ-substituted γ-acetyl butyric acids, and esters thereof, may be produced, as indicated below:

| Dione Starting Material | Acid Produced |
| --- | --- |
| 3-methyl-3-propionyl acetone | γ-methyl-γ-acetyl butyric acid. |
| 3-butyl pentanedione-2,4 | γ-butyl-γ-acetyl butyric acid. |
| 3 (2-ethylhexyl) pentanedione-2,4 | γ(2-ethylhexyl)-γ-acetyl butyric acid. |
| 3-butyl hexanedione-2,4 | γ-butyl-γ-acetyl butyric acid. |
| 3-propyl benzoyl acetone | γ-propyl-γ-acetyl butyric acid. |
| 3-benzyl pentanedione-2,4 | γ-benzyl-γ-acetyl butyric acid. |

The terms "alcohol," "alcoholic esterifying agent," and similar expressions are used in the claims to designate the monohydric aliphatic and aromatic alcohols; the monoalkyl and monoaryl ethers of the alkylene glycols and of the di- and polyalkylene glycols; and the dialkyl ethers of glycerol, such as the glycerol dimethyl and diethyl ethers.

The invention is susceptible of modification within the scope of the appended claims.

I claim:

1. Process for producing an ester of a γ-acetyl butyric acid substituted in the γ-position with a radical selected from the group consisting of the alkyl and aralkyl radicals, which comprises hydrolyzing a γ-cyanoethyl dione-2,4 substituted in the γ-position with a radical selected from the group consisting of the alkyl and aralkyl radicals, by heating such dione and water in the presence of an hydrolysis catalyst, thereby splitting off an acyl group from said substituted dione, concurrently esterifying the resultant γ-substituted γ-acetyl butyric acid as formed with an alcoholic esterifying agent in the presence of an esterification catalyst, and recovering from the esterification reaction mixture the corresponding ester of the γ-substituted γ-acetyl butyric acid thus produced.

2. Process which comprises hydrolyzing a γ-cyanoethyl alkanedione-2,4 substituted in the γ-position with a radical selected from the group consisting of the alkyl and aralkyl radicals, by heating and refluxing such dione and water in the presence of an hydrolysis catalyst, thereby splitting off an acyl group from said dione and forming a γ-acetyl butyric acid substituted in the γ-position with a radical selected from the group consisting of the alkyl and aralkyl radicals, and esterifying said substituted γ-acetyl butyric acid with an alcoholic esterifying agent by refluxing a mixture thereof in the presence of an acid esterification catalyst.

3. Process for producing an ester of a γ-acetyl butyric acid containing in the γ-position a radical selected from the group consisting of the alkyl and aralkyl radicals, which comprises hydrolyzing and esterifying a 3-cyanoethyl alkanedione-2,4 by heating such dione with an alcoholic esterifying agent and water, in the presence of an esterification catalyst, thereby splitting an acyl group from the dione, said alkanedione-2,4 having the two keto carbon atoms connected by a methylene group, one hydrogen atom of which has been replaced with a radical selected from the group consisting of the alkyl and aralkyl radicals, and recovering from the esterification reaction mixture the ester of the γ-substituted γ-acetyl butyric acid thus produced.

4. Process for producing an ester of a γ-acetyl butyric acid containing in the γ-position a radical selected from the group consisting of the alkyl and aralkyl radicals, which comprises heating at a temperature within the range between around 60° C. and around 150° C. in the presence of moisture, an alcoholic esterifying agent, an alkanedione-2,4 substituted in the γ-position with a cyanoethyl radical and with a radical selected from the group consisting of the alkyl and aralkyl radicals, and an acid esterification catalyst, thereby splitting off an acyl group from said substituted dione and concurrently esterifying the γ-substituted γ-acetyl butyric acid thus formed, and recovering from the esterification reaction mixture the resultant ester of the γ-substituted γ-acetyl butyric acid.

5. Process for producing an ester of a γ-acetyl butyric acid substituted in the γ-position with a radical selected from the group consisting of the alkyl and aralkyl radicals, which comprises hydrolyzing a γ-cyanoethyl pentanedione-2,4 substituted in the γ-position with a radical selected from the group consisting of the alkyl and aralkyl radicals, by heating and refluxing such dione and water in the presence of an hydrolysis catalyst, esterifying with an alcoholic esterifying agent the resultant γ-acetyl butyric acid substituted in the γ-position with said radical, in the presence of an acidic esterification catalyst, and recovering from the esterification reaction mixture the corresponding ester of the γ-acetyl butyric acid further substituted in the γ-position with said radical thus produced.

6. Process which comprises hydrolyzing a γ-cyanoethyl dione-2,4 substituted in the γ-position with a radical selected from the group consisting of the alkyl and aralkyl radicals, by heating such dione and water in the presence of an hydrolysis catalyst, thereby splitting off an acyl group from said dione, and forming a γ-acetyl butyric acid substituted in the γ-position with a radical selected from the group consisting of the alkyl and aralkyl radicals.

7. Process which comprises hydrolyzing a γ-cyanoethyl alkanedione-2,4 substituted in the γ-position with a radical selected from the group consisting of the alkyl and aralkyl radicals by heating such dione and water in the presence of an hydrolysis catalyst, thereby splitting off an acyl group from said dione and forming a γ-acetyl butyric acid substituted in the γ-position with a radical selected from the group consisting of the alkyl and aralkyl radicals.

8. Process which comprises hydrolyzing a γ-cyanoethyl alkanedione-2,4 substituted in the γ-position with a radical selected from the group consisting of the alkyl and aralkyl radicals by heating and refluxing such dione in the presence of moisture and a sulfuric acid catalyst, thereby splitting off an acyl group from said dione and forming a γ-acetyl butyric acid substituted in the γ-position with a radical selected from the group consisting of the alkyl and aralkyl radicals.

ALBERT B. BOESE, Jr.

REFERENCES CITED

The following references are of record in the file of this patent:

UNITED STATES PATENTS

| Number | Name | Date |
|---|---|---|
| 2,383,444 | Bruson | Aug. 28, 1945 |
| 2,353,687 | Bruson | July 18, 1944 |
| 2,311,183 | Bruson | Feb. 16, 1943 |
| 2,342,607 | Bruson | Feb. 22, 1944 |
| 2,287,510 | Bruson | June 23, 1942 |
| 1,992,615 | Hoffman et al. | Feb. 26, 1935 |
| 2,381,371 | Shannon | Aug. 7, 1945 |

OTHER REFERENCES

Ser. No. 377,664, Wiest (A. P. C.), published Feb. 6, 1941.

Beilstein, "Hand der Organ Chemic," vol. III, page 700 (13).

Fittig et al., "Annalen der Chem.," vol. 268, page 113.